(12) United States Patent
Amulothu et al.

(10) Patent No.: US 10,069,751 B2
(45) Date of Patent: Sep. 4, 2018

(54) ON-DEMAND IOT BANDWIDTH ALLOCATION IN RESPONSE TO A CHANGING SENSOR POPULATION

(71) Applicant: International Business Machines Corporation, Armonk, NY (US)

(72) Inventors: Venkata S. Amulothu, Plano, TX (US); Ashish Kapur, Santa Clara, CA (US); Vishal Shukla, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 14/930,778

(22) Filed: Nov. 3, 2015

(65) Prior Publication Data

US 2017/0126578 A1  May 4, 2017

(51) Int. Cl.
  *G06F 15/173* (2006.01)
  *H04L 12/911* (2013.01)
  *H04L 29/08* (2006.01)

(52) U.S. Cl.
  CPC .............. *H04L 47/70* (2013.01); *H04L 67/10* (2013.01)

(58) Field of Classification Search
  CPC ....... H04L 12/911; H04L 29/08; H04L 67/10; H04L 47/70
  See application file for complete search history.

(56) References Cited

U.S. PATENT DOCUMENTS

| | | |
|---|---|---|
| 7,197,370 B1 | 3/2007 | Ryskoski |
| 8,228,934 B2 | 7/2012 | Jeong et al. |
| 2008/0259919 A1 | 10/2008 | Monga |
| 2014/0223010 A1 | 8/2014 | Hayner |
| 2015/0350092 A1* | 12/2015 | Kwon ...................... H04L 47/22 709/223 |
| 2016/0094398 A1* | 3/2016 | Choudhury ............. H04L 45/42 370/254 |
| 2016/0105376 A1* | 4/2016 | Cvijetic ................ H04L 47/821 709/224 |
| 2016/0105489 A1* | 4/2016 | Llorca ..................... H04L 67/10 709/226 |

(Continued)

*Primary Examiner* — Benjamin M Thieu
(74) *Attorney, Agent, or Firm* — Schmeiser, Olsen & Watts, LLP; Michael Petrocelli

(57) ABSTRACT

A method and associated systems for on-demand Internet of Things bandwidth allocation in response to changing sensor populations. An IOT sensor device adds itself to or deletes itself from a cluster of IOT sensors. A physical IOT controller that manages the cluster detects this change, identifies a resulting change in the cluster's bandwidth requirements, and stores this information in a local database. When such a sensor-population change satisfies a triggering condition, the controller requests that a cloud-based application server adjust the controller's bandwidth allocation. The server aggregates this and similar requests from all connected controllers in a global database, and when controller bandwidth requirements satisfy a second triggering condition, the server, using a standard API, asks the cloud-management platform to reprovision the server's virtual bandwidth allocation. The server then distributes the adjusted bandwidth among its IOT controllers, which in turn allocate their adjusted bandwidths among their sensor devices.

20 Claims, 5 Drawing Sheets

(56) References Cited

U.S. PATENT DOCUMENTS

2016/0119434 A1* 4/2016 Dong .................. H04L 41/5054
                                                    709/220
2016/0198471 A1* 7/2016 Young .................. H04L 5/0037
                                                    370/329
2016/0262160 A1* 9/2016 Mo ........................ H04L 41/50

* cited by examiner

ON-DEMAND IOT BANDWIDTH ALLOCATION IN RESPONSE TO A CHANGING SENSOR POPULATION

TECHNICAL FIELD

The present invention relates to improving function and efficiency of an "Internet of Things" (IOT) network implemented on a cloud-based computing platform.

BACKGROUND

An "Internet of Things" (IOT) is a network of physically tangible electronic or computerized "things," such as environmental sensors, mobile devices, motion detectors, security cameras, and "smart" household appliances, that are equipped with network interfaces, computer processors, and, optionally, local user interfaces.

These IOT sensor devices collect data through sensors, cameras, or other monitoring means and transmit that data continuously, frequently, or in response to an occurrence of a triggering condition, to one or more remote IOT controllers through a network. Sensors may perform functions like reporting a current status of a household appliance, a smoke detector, or a motion sensor; or may give instructions to a monitored device in response to monitored data or in response to instructions received from the IOT controller over the network.

IOT controllers may in turn be managed by one or more remote IOT software applications that determine an overall operation of an IOT network and system and determine how to interpret and respond to data received from sensors and IOT controllers.

An IOT network, might for example, comprise a hundred carbon-monoxide detectors that each continuously monitors a background carbon-monoxide level in one unit of an apartment complex. When one of these sensors detects a dangerous level, it would automatically connect itself through a wireless connection to a remote IOT controller. This controller might then alert a building-management application running on a remote cloud-based IOT application server, and the application would in response transmit an emergency notification to a local fire department.

In such implementations, the application software and server may be deployed as virtual machines of a cloud-computing environment, by means of services purchased from an IaaS or PaaS service provider. These service providers typically allocate a fixed amount of network bandwidth to a virtual server, at the time the server is provisioned. This fixed bandwidth limit may not later be adjusted upward or downward on a dynamic, ad hoc basis.

Because the application server's bandwidth limit is static, the bandwidth that the server can make available to each of its IOT controllers is also static or limited. This creates bottlenecks because, as sensors continually enter and leave the IOT network, each IOT controller must manage a continually varying number of sensors, each of which may have continuously varying bandwidth requirements.

There is currently no straightforward way for a cloud-based application server to provide to an IOT controller the dynamic, varying network bandwidth that the controller needs in order to respond to real-time changes in a number of sensors that the IOT controller must manage.

BRIEF SUMMARY

A first embodiment of the present invention provides an IOT bandwidth-allocation system comprising a processor, a memory coupled to the processor, and a computer-readable hardware storage device coupled to the processor, the storage device containing program code configured to be run by the processor via the memory to implement a method for on-demand IOT bandwidth allocation in response to a changing sensor population, the method comprising:

the IOT bandwidth-allocation system accepting, from an IOT controller through an IOT network, a request for an amount of additional bandwidth, wherein the IOT bandwidth-allocation system is implemented as one or more virtualized resources of a cloud-computing environment that is managed by a cloud-management platform;

the IOT bandwidth-allocation system determining that IOT's bandwidth request satisfies a condition necessary to trigger sending a cloud-bandwidth request to the cloud-management platform;

the IOT bandwidth-allocation system, in response to the determining, requesting additional cloud bandwidth from the cloud-management platform by means of an application-programming interface supported by the cloud-management platform;

the IOT bandwidth-allocation system receiving the requested additional cloud bandwidth from the cloud-management platform; and the IOT bandwidth-allocation system allocating to the IOT controller a subset of the amount of additional cloud bandwidth received from the cloud-management platform.

A second embodiment of the present invention provides a method for on-demand IOT bandwidth allocation in response to a changing sensor population, the method comprising:

an IOT bandwidth-allocation system accepting, from an IOT controller through an IOT network, a request for an amount of additional bandwidth, wherein the IOT bandwidth-allocation system is implemented as one or more virtualized resources of a cloud-computing environment that is managed by a cloud-management platform;

the IOT bandwidth-allocation system determining that IOT's bandwidth request satisfies a condition necessary to trigger sending a cloud-bandwidth request to the cloud-management platform;

the IOT bandwidth-allocation system, in response to the determining, requesting additional cloud bandwidth from the cloud-management platform by means of an application-programming interface supported by the cloud-management platform;

the IOT bandwidth-allocation system receiving the requested additional cloud bandwidth from the cloud-management platform; and the IOT bandwidth-allocation system allocating to the IOT controller a subset of the amount of additional cloud bandwidth received from the cloud-management platform.

A third embodiment of the present invention provides a computer program product, comprising a computer-readable hardware storage device having a computer-readable program code stored therein, the program code configured to be executed by an IOT bandwidth-allocation system comprising a processor, a memory coupled to the processor, and a computer-readable hardware storage device coupled to the processor, the storage device containing program code configured to be run by the processor via the memory to implement a method for on-demand IOT bandwidth allocation in response to a changing sensor population, the method comprising:

the IOT bandwidth-allocation system accepting, from an IOT controller through an IOT network, a request for an amount of additional bandwidth, wherein the IOT bandwidth-allocation system is implemented as one or more virtualized resources of a cloud-computing environment that is managed by a cloud-management platform;

the IOT bandwidth-allocation system determining that IOT's bandwidth request satisfies a condition necessary to trigger sending a cloud-bandwidth request to the cloud-management platform;

the IOT bandwidth-allocation system, in response to the determining, requesting additional cloud bandwidth from the cloud-management platform by means of an application-programming interface supported by the cloud-management platform;

the IOT bandwidth-allocation system receiving the requested additional cloud bandwidth from the cloud-management platform; and the IOT bandwidth-allocation system allocating to the IOT controller a subset of the amount of additional cloud bandwidth received from the cloud-management platform.

DETAILED DESCRIPTION

We propose a simple standards-based communications protocol, software and hardware modules, and procedures that together allow a cloud-based IOT application server to adjust on demand amounts of bandwidth that it allocates to its IOT controllers.

Embodiments of this invention described in this example generally describe implementations in which IOT sensor devices communicate wirelessly with an IOT application over the public Internet or over a private or semi-private intranet. In such embodiments, an IOT network, application, application server, and the platform on which they reside might be implemented as virtualized cloud-based infrastructure provisioned as a service of an Information as a Service (IaaS) service provider.

An IOT network and its components, and embodiments of the present invention, need not, however, be limited to such implementations and may be deployed on any suitable virtual or physical computing platform known in the art. In some embodiments, for example, communications may all or part take place over a cellular network, through a hardwired local-area network, or through proprietary or hybrid communications mechanisms. As the state of the art advances, the basic inventive concept of the present invention, as described in embodiments and examples of the present invention described in this document, may be adapted through straightforward means into new technologies and communications methodologies that may arise in the art.

Figure 1:
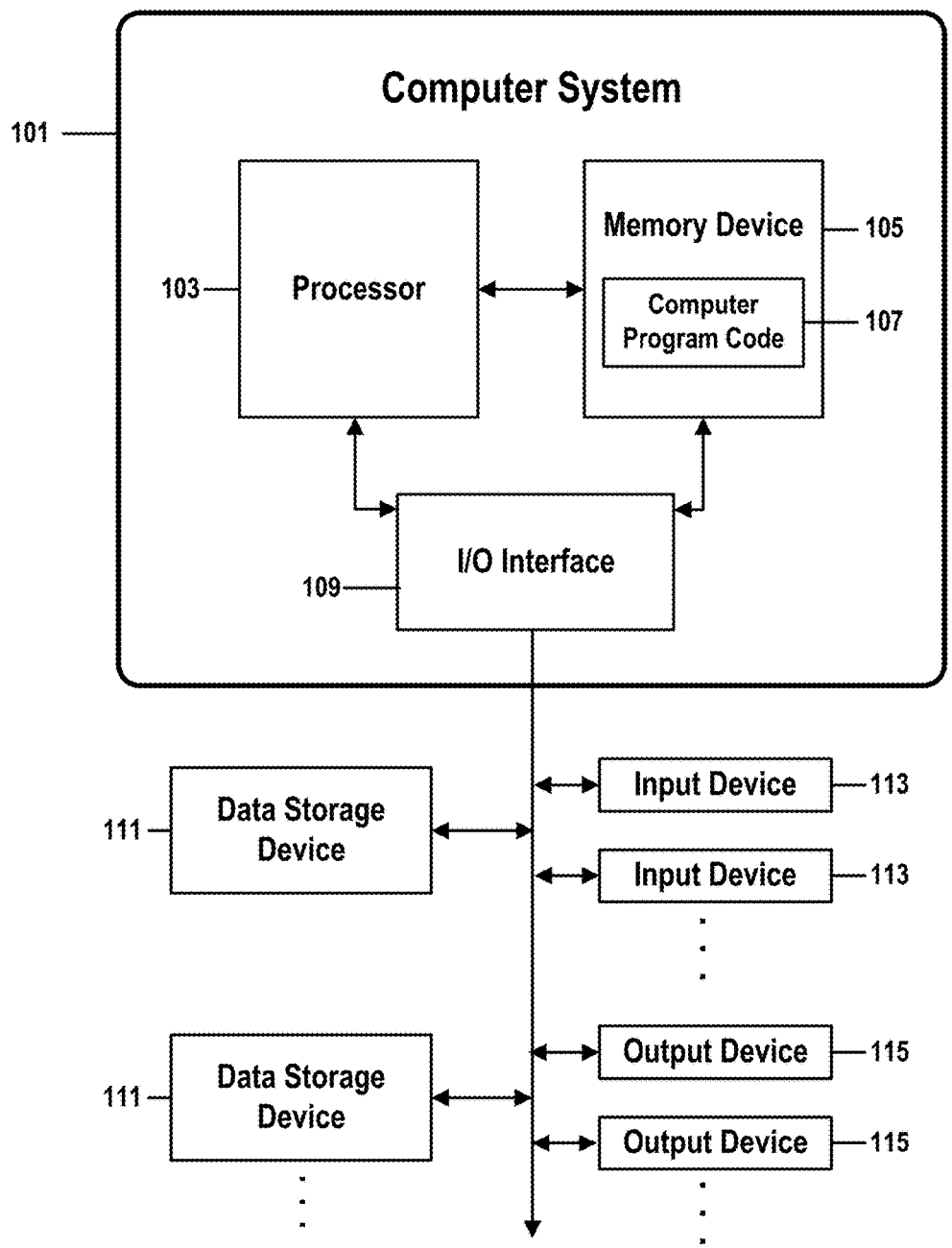
FIG. 1 shows a structure of a computer system and computer program code that may be used to implement a method for on-demand IOT bandwidth allocation in response to a changing sensor population in accordance with embodiments of the present invention.

FIG. 1 shows a structure of a computer system and computer program code that may be used to implement a method for on-demand IOT bandwidth allocation in response to a changing sensor population in accordance with embodiments of the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for on-demand IOT bandwidth allocation in response to a changing sensor population in accordance with embodiments of the present invention, and may implement other embodiments described in this specification, including the methods illustrated in FIGS. 1-5. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for on-demand IOT bandwidth allocation in response to a changing sensor population.

Any of the components of the present invention could be created, integrated, hosted, maintained, deployed, managed, serviced, supported, etc. by a service provider who offers to facilitate a method for on-demand IOT bandwidth allocation in response to a changing sensor population. Thus the present invention discloses a process for deploying or integrating computing infrastructure, comprising integrating computer-readable code into the computer system 101, wherein the code in combination with the computer system 101 is capable of performing a method for on-demand IOT bandwidth allocation in response to a changing sensor population.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for on-demand IOT bandwidth allocation in response to a changing sensor population may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for on-demand IOT bandwidth allocation in response to a changing sensor population data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
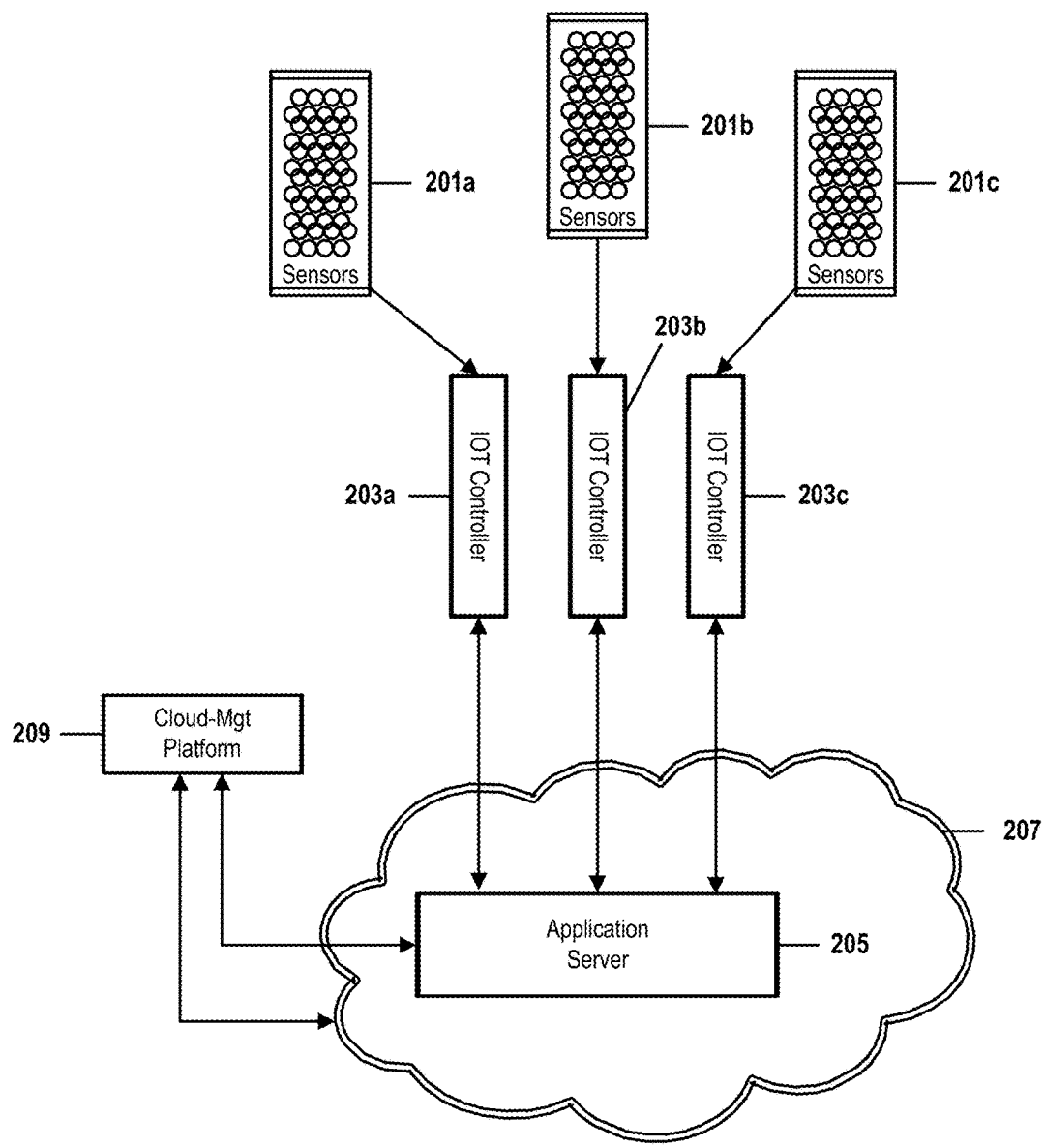
FIG. 2 shows an architecture of an Internet of Things (IOT) network.

FIG. 2 shows an architecture of an Internet of Things (IOT) network. FIG. 2 shows elements identified by reference numbers 201a-209.

Clusters of sensor devices 201a, 201b, and 201c each communicate with a respective IOT controller 203a, 203b, and 203c, through a network communications channel. A real-world IOT implementation may comprise many more cluster/controller pairs. A population of each cluster of sensor devices may vary continuously as sensors attach or detach themselves to the network.

A burglar-alarm sensor may, for example, be configured with a power switch, such that it automatically adds itself to an IOT network when a user enables it upon leaving a residence to be secured by the alarm. A smoke-detector sensor may connect to the network only when it detects certain dangerous conditions or when it needs a battery replacement.

Similarly, a sensor may be configured to automatically disconnect itself from the IOT network as soon as it determines (or as soon as an IOT controller 203a, 203b, or 203c controller determines) that a certain condition has been satisfied. For example, the smoke-detector, after having connected itself after sensing the presence of smoke, may automatically disconnect when it senses that the air has become clear.

Each connected sensor may require an amount of network bandwidth in order to communicate with its one or more associated IOT controllers 203a, 203b, or 203c. This bandwidth requirement may very small, if, for example, the sensor merely sends an alert code to a controller 203a, 203b, or 203c.

But other sensors may require significant amounts of bandwidth. A sensor device that monitors motion in a high-security area, for example, may, upon being triggered a detection of movement, begin transmitting a real-time stream of high-resolution tracking data, or even a video or infrared feed.

The bandwidth requirements of a cluster of sensors 201a, 201b, or 201c managed by a particular IOT controller 203a, 203b, or 203c may thus fluctuate continuously over time, at least in part as a function of a number of controllers currently populating the cluster 201a, 201b, or 201c, of characteristics and programming of each sensor of a cluster 201a, 201b, or 201c or of an IOT controller 203a, 203b, or 203c, or of conditions that govern when and why a sensor attaches itself to or detaches itself from the IOT network.

The communications infrastructure through which an IOT controller 203a, 203b, or 203c communicates with its respective cluster of sensors 201a, 201b, or 201c may be any type of network connection or communications medium known in the art. These communications may, for example, comprise a combination of a Wi-Fi or Bluetooth wireless connection, a wired Ethernet LAN, a cellular network.

Each IOT controller 203a, 203b, or 203c may be comprise a physical electronic or computerized hardware module, software, firmware, a communications interface, or combinations thereof. It may reside at a physical location local to that of its sensors 201a, 201b, or 201c or may be located at a remote site.

In some implementations, each IOT controller 203a, 203b, or 203c may be implemented or configured in a similar manner and may use similar communications means to communicate with other components of the IOT network. But in other implementations, an IOT controller 203a, 203b, or 203c may be implemented or configured and may communicate in a manner that is different than that of other controllers 203a, 203b, or 203c in the network.

Each IOT controller 203a, 203b, or 203c communicates with an IOT application server 205 through communications methods known in the art. If, for example, application server 205 is implemented as a virtual machine on a cloud-computing environment 207, an IOT controller 203a, 203b, or 203c might communicate with the application server 205 through an Internet connection.

Application server 207 runs IOT application software that manages an operation of the IOT network. This application software might, for example, upon receiving an alert from an IOT controller 203a, 203b, or 203c that a sensor device of a cluster 201a, 201b, or 201c had detected an anomalous condition, direct the controller 203a, 203b, or 203c to light an emergency-alert LED on the sensor device.

The Application software might also manage other tasks, such as providing a use-management console for the IOT network, directing the IOT controllers 203a, 203b, and 203c to perform periodic integrity checks on sensor devices, or taking automatic remedial action when a sensor reports a certain condition.

The platform on which application server 207 is deployed may be managed by means of a network-management console or other mechanism 209. In embodiments in which application server 207 is a virtual machine provisioned on a cloud-computing platform 207, network-management tool 209 might be a cloud-management platform that manages characteristics and configurations of the cloud 207, such as provisioning and deprovisioning virtual infrastructure, monitoring resource utilization, and managing bandwidth and network traffic.

Figure 3:
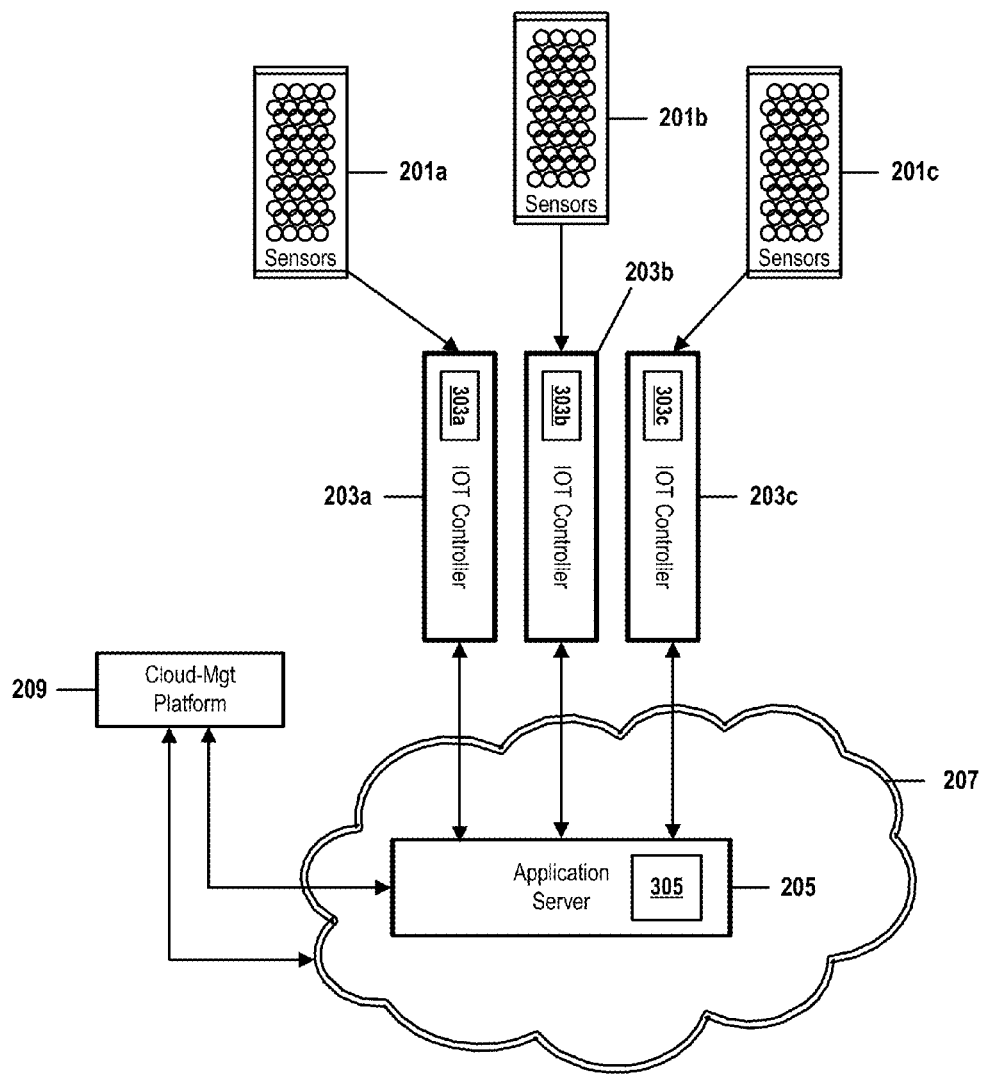
FIG. 3 shows an enhanced architecture of an Internet of Things (IOT) network in which an embodiment of the present invention has been implemented.

FIG. 3 shows an architecture of an Internet of Things (IOT) network in which an embodiment of the present invention has been implemented. FIG. 3 shows elements identified by reference numbers 201a-209 and 301a-301c.

Elements 201a-209 are identical in structure and function to similarly numbered elements in FIG. 2.

Local modules 303a, 303b, and 303c are components of the present invention that, respectively, add functionality to IOT controllers 203a, 203b, and 203c. Each local module 303a, 303b, or 303c may be implemented as a distinct component that either complements or is integrated into a respective IOT controller 203a, 203b, or 203c.

Each local module 303a, 303b, or 303c keeps track of which sensors currently make up a sensor cluster 201a, 201b, or 201c of its associated IOT controller 203a, 203b, or 203c, and maintains a running total of the current bandwidth requirements, and additional needed bandwidth, of those sensors. When certain conditions are satisfied, a local module 303a, 303b, or 303c may, by means of global module 305, notify application server 205 that it requires additional bandwidth.

Although an internal structure of a local module 303a, 303b, or 303c may to some extent be implementation-dependent, embodiments and examples described in this document may comprise either or both of the components:

a continuously updated local-bandwidth database 403 that continuously monitors how many sensors are currently active and attached to respective IOT controller 203a, 203b, or 203c, and specifies current network usage of each attached sensor; and a local-bandwidth calculator that monitors the local-bandwidth database and tracks a total amount of bandwidth required by the IOT controller 203a, 203b, or 203c in order to satisfy the needs of all sensors currently attached to and managed by that controller 203a, 203b, or 203c. When this total bandwidth requirement exceeds a threshold value, or otherwise satisfies a predetermined condition, the calculator will trigger a bandwidth request to application server 205. This request may be transmitted by sending a packet of data or other type of communications message to global module 305.

Global module 305 is a component of the present invention that adds functionality to application server 205 and to the IOT application component that is deployed on application server 205.

Global module 305 is shown in FIG. 3 as being a module deployed on application server 205, but in some embodiments global module 305 may be integrated into the IOT software application, or may be implemented as a distinct module, running on some other platform, that communicates directly with the IOT software application or the application server 205 on which the application runs.

Global module 305 keeps track of which IOT controllers 203a, 203b, or 203c are currently active, and maintains a running total of the current bandwidth requirements, and additional needed bandwidth, of those sensors. When certain conditions are satisfied, global module 305 may notify cloud-management platform 209 that the IOT network requires additional bandwidth to be allocated from cloud resources.

Although an internal structure of global module 305 may to some extent be implementation-dependent, embodiments and examples described in this document may comprise either or both of the components:

a continuously updated global-bandwidth database 405 that identifies current bandwidth usage of, and amounts of additional bandwidth requested by, each IOT controller 205a, 205b, or 205c; and a global-bandwidth calculator that continuously monitors the global bandwidth database, determines how many and which IOT controllers 205a, 205b, or 205c are currently active, and tracks a total amount of bandwidth required by each active IOT controller 205a, 205b, or 205c in order to satisfy the needs of sensors currently attached to and managed by that controller 205a, 205b, or 205c. When this total bandwidth requirement exceeds a threshold value, or otherwise satisfies a predetermined condition, the calculator will trigger a bandwidth request to the cloud-management platform 209. This request may take the form of a message created and transmitted by means of protocols, routines, or software tools of a standard Application Programming Interface (API) supported by the cloud service provider.

In some embodiments, this API may comprise the well-known Representational State Transfer (REST) convention, which defines practices and standards common to much of the architectural design of the World Wide Web.

In some embodiments, each IOT controller 203a, 203b, or 203c may comprise an instance of local module 303a, 303b, or 303c, and each application server 205 may be associated with only one instance of global module 305. In other embodiments, however, two or more local modules 303a, 303b, or 303c may be associated with each IOT controller 203a, 203b, or 203c and two or more global modules 305 may be associated with an application server 205 or with an IOT application deployed on an application server 205. Many variations on the topologies described in this document are possible, but in all cases, those variations should comprise the general architecture shown in FIG. 3.

Figure 4:
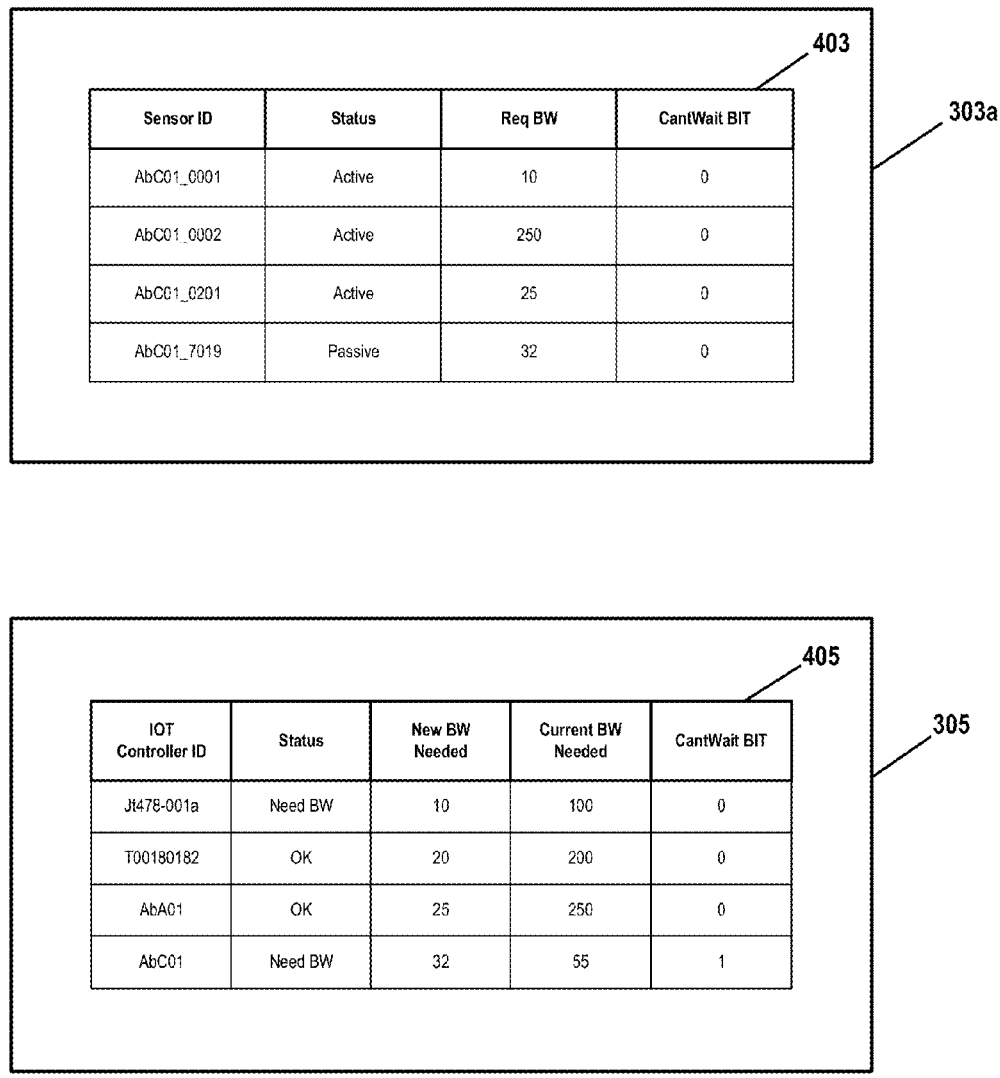
FIG. 4 shows internal details of local modules and global modules shown in FIG. 3.

FIG. 4 shows details of items represented in FIG. 3. FIG. 4 elements identified by reference numbers 303a, 305, 403, and 405. Elements 303a and 305 are identical in structure and function to similarly numbered elements in FIG. 2.

As described above in FIG. 3, item 303a one of three local modules 303a, 303b, and 303c that are comprised respectively by IOT controllers 203a, 203b, and 203c. As mentioned above, these three sets of components are merely examples of what may be, in a real-world implementation, much larger large numbers of IOT controllers and corresponding local modules.

In order to simplify this explanation, FIG. 4 shows an example of an internal local-bandwidth database 403 of only one of local modules 303a, 303b, and 303c. Similarly it shows an example of an internal global-bandwidth database 405 of only one of global modules 305, 305b, and 305c. In a real-world embodiment of the present invention, these structures, or analogous structures, might be duplicated in each local module 303a, 303b, or 303c of a respective IOT controller 203a, 203b, or 203c, or in each global module 305 of an application server 205.

As described above in FIG. 3, local-bandwidth database 403 continuously monitors a number of sensor devices of a cluster of sensors 201a that are currently active, attached to IOT controller 203a, or exchanging information with IOT controller 203a.

Local-bandwidth database 403 also specifies amounts of current network bandwidth required by each sensor. In some embodiments, database 403 may also identify a binary state of a local "CantWait" bit or flag that indicates when additional bandwidth must be immediately allocated to a sensor device.

In some embodiments, local-bandwidth database 403 may identify this information only for sensors that are active, attached, or communicating bandwidths, and in other embodiments, including the one shown in FIG. 4, may identify this information for all sensors associated with IOT controller 203a.

As described in FIG. 3, global-bandwidth database 405 continuously monitors bandwidth requirements of IOT controllers 203a, 203b, or 203c attached to or exchanging information with application server 205.

Global-bandwidth database 405 also specifies amounts of current network bandwidth required by each IOT controller 203a, 203b, or 203c. In some embodiments, database 405 may also identify a binary state of a global "CantWait" bit or flag that indicates when additional bandwidth must be immediately allocated to an IOT controller 203a, 203b, or 203c.

In the examples of FIG. 4, local-bandwidth database 403 lists four sensors of sensor cluster 201a that are associated with IOT controller 203a. Each row of database 403 identifies information about one of these four sensors.

The first three sensors are identified in database 403 as being "Active," meaning that they are operational and in communication with IOT controller 203a. This may occur when, for example, a motion-detector security device is activated by a user's manual entry of a security code. In some cases, an "Active" status may indicate that a sensor has detected a condition that must be reported to the application server 205.

The fourth sensor identified in database 403 ("AbC01_7019"), is identified as "Passive," meaning that it does not currently require an allocation of bandwidth. In embodiments, this may mean that the fourth sensor is switched off, is malfunctioning, is performing an operation that does not require immediate communications with IOT controller 203a or with application server 205, or is in a standby or sleep mode.

The "Req BW" column of database 403 indicates an amount of bandwidth required by one of the listed sensors. Depending on implementation-details of an embodiment, this listing may represent an amount of bandwidth currently required in excess of bandwidth that has already been allocated to the sensor, it may represent a total amount of bandwidth currently required by the sensor, or it may represent an amount of bandwidth that the sensor is known to require during normal operation.

The example of FIG. 4 illustrates an example of this last type of representation. Here, the fourth sensor has a "Passive" status, indicating that it is not currently communicating with IOT controller 203a. The "Req BW" column of database 403 lists a bandwidth requirement of 32 (possibly representing 32 Kbps or 32 Mbps) that the sensor is expected to need when it is reattached to the IOT network at a future time.

In some embodiments, the amounts of required bandwidth identified in database 403 may indicate long-term requirements that may be requested by each sensor, but which have not yet been satisfied. In some embodiments, however, an immediate, critical bandwidth requirement that must be satisfied as quickly as possible may be indicated by a state of a triggering bit or flag indicated by an entry in the "CantWait BIT" column.

The "CantWait BIT" column indicates a state of a CantWait bit or flag associated with each sensor. In this example, setting the bit or flag set to a value of 1 indicates that the corresponding sensor must be allocated bandwidth immediately. Such a condition may occur as a function of a sensor status or priority. A CantWait bit of a sensor identified as "critical," for example, may be set to 1 whenever that critical sensor demands additional bandwidth.

In some embodiments, a CantWait condition may occur when a total amount of bandwidth required, in aggregate, by all sensors of sensor cluster 201a exceeds a threshold limit or satisfies some other condition. In such a case, local module 303a may set to 1 the CantWait bits for all active sensors; or it may set to 1 a CantWait bit only of the sensor that caused the controller 203*a*'s aggregate bandwidth requirement to exceed the threshold or satisfy the condition.

In such embodiments, this exceeding the threshold or satisfying the condition may automatically trigger a bandwidth request to be sent from IOT controller 203*a* to application server 205. In some embodiments, this request may be sent indirectly from controller 203*a* to server 205, by being sent directly from local module 303*a* to global module 305.

The example of FIG. 4 illustrates an example of this last type of representation. Here, the fourth sensor has a "Passive" status, indicating that it is not currently communicating with IOT controller 203*a*. The "Req BW" column of database 403 lists a bandwidth requirement of 32 (possibly representing 32 Kbps or 32 Mbps) that the sensor is expected to need when it is reattached to the IOT network at a future time.

In some embodiments, the amounts of required bandwidth identified in database 403 may indicate long-term requirements that may be requested by each sensor, but which have not yet been satisfied. In some embodiments, however, an immediate, critical bandwidth requirement that must be satisfied as quickly as possible may be indicated by a state of a triggering bit or flag indicated by an entry in the "CantWait BIT" column.

The "CantWait BIT" column indicates a state of a CantWait bit or flag associated with each sensor. In this example, setting the bit or flag set to a value of 1 indicates that the corresponding sensor must be allocated bandwidth immediately. Such a condition may occur as a function of a sensor status or priority. A CantWait bit of a sensor identified as "critical," for example, may be set to 1 whenever that critical sensor demands additional bandwidth.

In some embodiments, a CantWait condition may occur when a total amount of bandwidth required, in aggregate, by all sensors of sensor cluster 201*a* exceeds a threshold limit or satisfies some other condition. In such a case, local module 303*a* may set to 1 the CantWait bits for all active sensors; or it may set to 1 a CantWait bit only of the sensor that caused the controller 203*a*'s aggregate bandwidth requirement to exceed the threshold or satisfy the condition.

In such embodiments, this exceeding the threshold or satisfying the condition may automatically trigger a bandwidth request to be sent from IOT controller 203*a* to application server 205. In some embodiments, this request may be sent indirectly from controller 203*a* to server 205, by being sent directly from local module 303*a* to global module 305.

As shown in FIG. 4, global-bandwidth database 405 performs a function analogous to that of global-bandwidth database 405. As described above in FIG. 3, global-bandwidth database 405 continuously monitors bandwidth requirements of each IOT controller 205*a*, 205*b*, or 205*c* attached to or exchanging information with application server 205. In some embodiments, database 405 may also identify a binary state of a global "CantWait" bit or flag that indicates when additional bandwidth must be immediately allocated to a sensor device attached to an IOT controller 203*a*, 203*b*, or 203*c*.

In the examples of FIG. 4, global-bandwidth database 405 lists four IOT controllers 203*a*, 203*b*, or 203*c* that are under the control of application server 205. Each row of database 405 identifies information about one of these four controllers 203*a*, 203*b*, or 203*c*.

The "Status" column of global-bandwidth database 405 identifies that only the first and fourth controllers 203*a*, 203*b*, or 203*c* currently require bandwidth in addition to the amounts of bandwidth already allocated to each controller. This may occur when, for example, an aggregate amount of bandwidth required by a cluster of sensors 201*a*, 201*b*, or 201*c* exceeds a threshold level, or satisfies an other triggering condition. In response to detecting such an event, a local module 203*a*, 203*b*, or 203*c* may set to 1 a CantWait bit or flag in local-bandwidth database 403, thus causing the local-bandwidth module to notify the global-bandwidth module that an IOT controller requires bandwidth.

In some embodiments, such an event may automatically cause the global module 305 to set the requesting controller's global CantWait bit or flag to a value of 1 in global-bandwidth database 405. In other embodiments, a further condition must occur in order for that bit or flag to be set. This further condition may, for example, be an association of the requesting controller as being a "mission-critical" device, a detection by the global module 305 that the requesting controller's bandwidth request exceeds a threshold value that may be set globally or that may be specific to that controller, or a detection by the global module 305 that the requesting controller's bandwidth request causes an aggregate bandwidth requirement for all controllers 203*a*, 203*b*, and 203*c* to exceed a threshold.

When such an event or condition occurs, global module 305 will request additional bandwidth from cloud-management platform 209.

In some embodiments, global-bandwidth table 405, may simply identify each tabulated controller's total required amount of bandwidth in a "Req BW" column, in a manner similar to that of local-bandwidth table 403.

In an embodiment shown in FIG. 4, global-bandwidth table 405 identifies each tabulated controller's bandwidth requirements with greater granularity, identifying both the current amount of bandwidth requested or allocated to each controller (in the "Current BW Needed" column) and the amount of additional bandwidth that has been requested by each controller (in the "New BW Needed" column). Triggering conditions that may cause global module 305 to request bandwidth from the cloud-management platform 209 may be a function of information identified in either or both of these columns Local-bandwidth database 403 and global-bandwidth database 405 may be continuously updated, respectively, by local module 303*a* or IOT controller 203*a*, and by global module 305 or application server 205. In some embodiments, continuous, real-time, or frequent updating ensures that when a sensor device enters the IOT network or when a sensor device already attached to the IOT network requires additional bandwidth, that this change in sensor status or bandwidth requirements is immediately identified by the IOT controller 203*a*, which then is able to immediately notify application 205 of this change as soon as is required. Embodiments of the present invention comprise an analogous mechanism to reduce bandwidth allocations when a sensor is detached from the IOT network or when a sensor attached to the IOT network requires less bandwidth than an amount that has already been allocated to that sensor.

Figure 5:
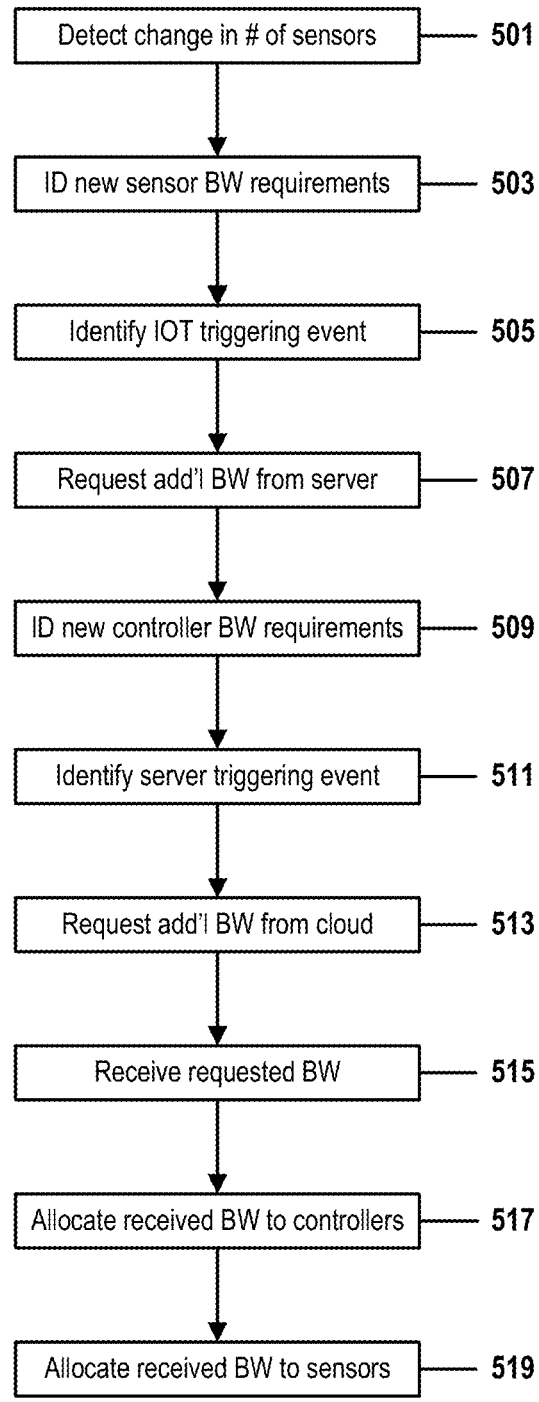
FIG. 5 shows a method for on-demand IOT bandwidth allocation in response to a changing sensor population in accordance with embodiments of the present invention.

FIG. 5 shows a method for on-demand IOT bandwidth allocation in response to a changing sensor population in accordance with embodiments of the present invention. FIG. 5 comprises steps 501-519.

In step 501, an IOT bandwidth-allocation system of an IOT network that comprises a computerized or software-based module of a virtual IOT application detects a change in a number of sensor devices attached to the IOT network or in a bandwidth requirement of a currently attached sensor. This change may be a function of an automatic or manual addition of a first sensor to the IOT network, a change in a status or condition of the first sensor, or a removal of the first sensor from the IOT network. In examples shown herein, the first sensor may be comprised by a cluster of sensors 201a, 201b, or 201c that are under the control of, and in communication with, a respective IOT controller 203a, 203b, or 203c. Each of these controllers 203a, 203b, and 203c comprises a respective local module 303a, 303b, or 303c that identifies a status and current bandwidth requirement of each sensor device of the respective cluster of sensors 201a, 201b, or 201c attached to that controller 203a, 203b, or 203c.

In examples shown in FIG. 5, the IOT application may be deployed as a virtual machine on a cloud-based application server 205 and either the server 205 or the application may comprise a global module 305. The IOT bandwidth-allocation system may be a component of global module 305, or it may be a component of the IOT application or of the application server 205 that itself comprises global module 305.

As shown in FIGS. 2 and 3, the cloud-based application server 205 may be provisioned in a cloud-computing environment 207 that is managed by a cloud-management platform 209. The cloud-based application server 205 communicates from the cloud to one or more IOT controllers 203a, 203b, or 203c, each of which comprises the respective local module 303a, 303b, or 303c that identifies a status and current bandwidth requirement of each sensor device of the respective cluster of sensors 201a, 201b, or 201c attached to that controller.

When an IOT controller 203a, 203b, or 203c detects the change in the first sensor, that detection may have been a function of an automatic communication from the first sensor to the local module 303a, 303b, or 303c comprised by the IOT controller 203a, 203b, or 203c.

In step 503, the system identifies an amount of an adjustment of a bandwidth allocation required by the first sensor. The amount of this adjustment may be a function of the change in first sensor's status or bandwidth requirements identified in step 501, or it may be a predetermined figure specifically associated with the first sensor whenever it is attached to the IOT network in a certain configuration.

In some cases, the amount adjustment may indicate that less bandwidth should be allocated to a controller 203a, 203b, or 203c, as a function of a detachment of the first sensor device from the IOT network, or of a reduction in an already attached first device's bandwidth requirements.

As described in FIG. 4, this information may be incorporated into a record of local-bandwidth database 403 comprised by a local module 303a, 303b, or 303c or respective IOT controller 203a, 203b, or 203c. This entry may comprise an identifier of the first sensor, a status field that identifies that the first sensor requires an adjustment to its current bandwidth allocation, an amount of bandwidth required or requested by the first sensor, and an identification of a state a CantWait bit or flag that identifies whether the bandwidth request must be satisfied as soon as possible.

In step 505, the system identifies an occurrence of a triggering event that will cause the IOT controller 203a, 203b, or 203c to request bandwidth from the application server 205.

As described in FIG. 4, the triggering event may be an occurrence of a condition, or a determination by the IOT controller 203a, 203b, or 203c that a total aggregate amount of bandwidth required by all sensor devices attached though the IOT network to the controller 203a, 203b, or 203c has exceeded a threshold value.

In some embodiments, an occurrence of the triggering condition may result in one or more local CantWait bits or flags being set to a TRUE value in local-bandwidth database 403 303c. In some embodiments, an automatic setting of a local CantWait bit or flag in response to identifying the first sensor's adjusted bandwidth requirements may itself be a triggering condition.

In step 507, the IOT controller 203a, 203b, or 203c, in response to detecting the occurrence of the triggering event in step 505, as a result of the change in a number of sensors or in an amount of bandwidth required by the sensors, communicates a message to the application server 205 requesting that the server 205 adjust an amount of cloud bandwidth allocated to that IOT controller 203a, 203b, or 203c.

As described in FIG. 4, in some embodiments, this message may be directly communicated between a local module 303a, 303b, or 303c of an IOT controller 203a, 203b, or 203c to a global module 305 comprised by the application server 205 or by the IOT software application deployed on the application server 205.

In step 509, the system, via the application server 205, IOT application, or global module 305, receives the bandwidth-adjustment request sent by IOT controller 203a, 203b, or 203c in step 507. This request contains information that allows the system to determine an adjusted amount of bandwidth required by the requesting IOT controller 203a, 203b, or 203c.

As explained in FIG. 4, the global module may use information in the requesting message to add or update an entry of the global-bandwidth management database that corresponds to the requesting IOT controller 203a, 203b, or 203c.

This entry may comprise an identifier of the requesting controller 203a, 203b, or 203c, a status field that identifies that the requesting controller requires an adjustment to its current bandwidth allocation, an amount of bandwidth currently allocated to the requesting controller, and an amount of the requested bandwidth adjustment.

As further described in FIG. 4, this entry of global-bandwidth database 405 may also identify a state a global CantWait bit or flag associated with the requesting controller 203a, 203b, or 203c that identifies whether the bandwidth request must be satisfied as soon as possible, and may further indicate an occurrence of a triggering event or condition that requires the system to immediately request a bandwidth adjustment from the cloud-management platform 209.

In step 511, the system identifies an occurrence of a triggering event that will cause the global module 305 to request from the cloud-management platform 209 an adjustment in an amount of cloud bandwidth allocated to the application server 205.

As described in FIG. 4, the triggering event may be an occurrence of a condition, or a determination by the global module 305 that a total aggregate amount of bandwidth required by all IOT controllers 203a, 203b, or 203c attached though the IOT network to the application server 205 has exceeded a threshold value or has satisfied some other triggering condition. Such a condition might, for example, be a determination that the first sensor, or the requesting IOT controller 203a, 203b, or 203c to which the first sensor is attached, has been characterized as a mission-critical emergency device.

In some embodiments, an occurrence of a triggering condition may result in one or more global CantWait bits or flags being set to a TRUE value in global-bandwidth database 405. In some embodiments, an automatic setting of a global CantWait bit or flag in response to receiving the global bandwidth-adjustment request in step 507 may itself be a triggering condition.

In step 513, the global module 305, in response to identifying a global triggering event or condition in step 511, communicates a message to the cloud-management platform 209 requesting that the cloud-management platform 209 adjust an amount of cloud bandwidth provisioned to the virtualized application server 205.

As described in FIGS. 3 and 4, this requesting message may be communicated to the cloud-management platform 209 by means of protocols, routines, or software tools of a standard or generally recognized Application Programming Interface (API) supported by the cloud service provider. In some embodiments, this API may comprise the well-known Representational State Transfer (REST) convention, which identifies conventions, general practices, and standards common to much of the architectural design of the World Wide Web and TCP/IP network communications.

In step 515, the system is allocated the requested bandwidth in response to the request of step 513. The bandwidth-allocation procedure takes place here through conventional communications mechanisms between the cloud-management platform 209 and a component of the virtualized, cloud-based application server 205 provisioned on the cloud-computing environment 207 that is managed by the cloud-management platform 209. Although there remains no standard method for a sensor of the IOT network, or for a physical, remotely located, IOT controller 203*a*, 203*b*, or 203*c* to directly request an adjustment to an existing allocation of cloud bandwidth or other cloud resources, the method of FIG. 2 provides an indirect, database-driven, automated method of provisioning cloud resources on-demand to sensors that continuously and autonomously attach to and detach from the IOT network.

In step 517, the global module 305 allocates the adjusted bandwidth provided to it by the cloud-management platform 209 among IOT controllers 203*a*, 203*b*, or 203*c*, as a function of the required bandwidth information associated with each controller 203*a*, 203*b*, or 203*c* in the global-bandwidth database 405.

In step 519, local modules 303*a*, 303*b*, and 303*c*, of respective IOT controllers 203*a*, 203*b*, and 203*c* allocate the adjusted bandwidth provided to them by the application server 205, as a function of the required bandwidth information associated with each sensor in the local-bandwidth database 403.

At the conclusion of the method of FIG. 2, the bandwidth adjustment necessitated by the addition or removal of the first sensor, or by an other change in a status of the first sensor, has been communicated to a physical IOT controller 203*a*, 203*b*, or 203*c* associated with the first sensor, which prioritizes the bandwidth-adjustment request, and, if a triggering event has occurred, forwards a resulting aggregated bandwidth request to application server 205. The application server 205 in turn prioritizes this request and, if a triggering event has occurred, forwards a further-aggregated bandwidth request to cloud-management platform 209. In response, the cloud-management platform 209 allocates the requested bandwidth to the server 205, which distributes bandwidth resources to the IOT controllers 203*a*, 203*b*, and 203*c*, which then each distributes its share of the bandwidth to its sensors.

In embodiments, this method repeats continuously, as IOT controllers 203*a*, 203*b*, and 203*c* each constantly monitors its respective cluster of sensors 201*a*, 201*b*, and 201*c* in order to respond quickly to an addition, deletion, or other status change of one of its associated sensors. The controllers IOT controllers 203*a*, 203*b*, and 203*c* thus continuously update their embedded local-bandwidth tables to identify changes in sensor bandwidth requirements resulting from these changes and, when a triggering event or condition occurs, request a bandwidth adjustment from cloud-based application server 205.

Similarly, server 205 accumulates bandwidth-adjustment requests from each of its attached IOT controllers in a global-bandwidth database and, when a global triggering event occurs, requests a global bandwidth adjustment from cloud-management platform 209.

What is claimed is:

1. An IOT bandwidth-allocation system comprising a processor, a memory coupled to the processor, and a computer-readable hardware storage device coupled to the processor, the storage device containing program code configured to be run by the processor via the memory to implement a method for on-demand IOT bandwidth allocation in response to a changing sensor population, the method comprising:

the IOT bandwidth-allocation system accepting, from an IOT controller through an IOT network, a request for an amount of additional bandwidth, wherein the IOT bandwidth-allocation system is implemented as one or more virtualized resources of a cloud-computing environment that is managed by a cloud-management platform;

the IOT bandwidth-allocation system determining that the IOT controller's bandwidth request satisfies a condition necessary to trigger sending a cloud-bandwidth request to the cloud-management platform;

the IOT bandwidth-allocation system, in response to the determining, requesting additional cloud bandwidth from the cloud-management platform by means of an application-programming interface supported by the cloud-management platform;

the IOT bandwidth-allocation system receiving the requested additional cloud bandwidth from the cloud-management platform; and the IOT bandwidth-allocation system allocating to the IOT controller a subset of the amount of additional cloud bandwidth received from the cloud-management platform.

2. The IOT bandwidth-allocation system of claim 1, wherein the amount of additional bandwidth requested by the IOT controller is a function of a change in a status of at least one sensor of a cluster of sensor devices connected to the IOT controller through the IOT network.

3. The IOT bandwidth-allocation system of claim 2, wherein the change of status of the at least one sensor is the at least one sensor's autonomous addition of itself to the cluster of sensors.

4. The IOT bandwidth-allocation system of claim 2, wherein the IOT's bandwidth request is a function of an aggregate amount of bandwidth required by the cluster of sensors at the time that the IOT generates its bandwidth request.

5. The IOT bandwidth-allocation system of claim 2, wherein the IOT's bandwidth request is a function of a change in a total number of sensors comprised by the cluster of sensors at the time that the IOT generates the bandwidth request.

6. The IOT bandwidth-allocation system of claim 2, wherein the amount of cloud bandwidth requested from the cloud-management platform is a function of an aggregate amount of bandwidth requested by all IOT controllers connected to the system through the IOT network.

7. The IOT bandwidth-allocation system of claim 1, wherein the requesting the additional cloud bandwidth from the cloud-management platform is performed as a function of an occurrence of a predetermined triggering event related to the IOT's bandwidth request.

8. A method for on-demand TOT bandwidth allocation in response to a changing sensor population, the method comprising:
   an TOT bandwidth-allocation system accepting, from an TOT controller through an TOT network, a request for an amount of additional bandwidth, wherein the TOT bandwidth-allocation system is implemented as one or more virtualized resources of a cloud-computing environment that is managed by a cloud-management platform;
   the TOT bandwidth-allocation system determining that the TOT controller's bandwidth request satisfies a condition necessary to trigger sending a cloud-bandwidth request to the cloud-management platform;
   the TOT bandwidth-allocation system, in response to the determining, requesting additional cloud bandwidth from the cloud-management platform by means of an application-programming interface supported by the cloud-management platform;
   the TOT bandwidth-allocation system receiving the requested additional cloud bandwidth from the cloud-management platform; and
   the TOT bandwidth-allocation system allocating to the TOT controller a subset of the amount of additional cloud bandwidth received from the cloud-management platform.

9. The method of claim 8, wherein the amount of additional bandwidth requested by the TOT controller is a function of a change in a status of at least one sensor of a cluster of sensor devices connected to the TOT controller through the TOT network.

10. The method of claim 9, wherein the change of status of the at least one sensor is the at least one sensor's autonomous addition of itself to the cluster of sensors.

11. The method of claim 9, wherein the IOT's bandwidth request is a function of a change in a total number of sensors comprised by the cluster of sensors at the time that the IOT generates the bandwidth request, and is a further function of an aggregate amount of bandwidth required by the cluster of sensors at the time that the IOT generates its bandwidth request.

12. The method of claim 9, wherein the amount of cloud bandwidth requested from the cloud-management platform is a function of an aggregate amount of bandwidth requested by all IOT controllers connected to the system through the IOT network.

13. The method of claim 8, wherein the requesting the additional cloud bandwidth from the cloud-management platform is performed as a function of an occurrence of a predetermined triggering event related to the IOT's bandwidth request.

14. The method of claim 8, further comprising providing at least one support service for at least one of creating, integrating, hosting, maintaining, and deploying computer-readable program code in the computer system, wherein the computer-readable program code in combination with the computer system is configured to implement the accepting, determining, requesting, receiving, and allocating.

15. A computer program product, comprising a computer-readable hardware storage device having a computer-readable program code stored therein, the program code configured to be executed by an IOT bandwidth-allocation system comprising a processor, a memory coupled to the processor, and a computer-readable hardware storage device coupled to the processor, the storage device containing program code configured to be run by the processor via the memory to implement a method for on-demand IOT bandwidth allocation in response to a changing sensor population, the method comprising:
   the IOT bandwidth-allocation system accepting, from an IOT controller through an IOT network, a request for an amount of additional bandwidth, wherein the IOT bandwidth-allocation system is implemented as one or more virtualized resources of a cloud-computing environment that is managed by a cloud-management platform;
   the IOT bandwidth-allocation system determining that the IOT controller's bandwidth request satisfies a condition necessary to trigger sending a cloud-bandwidth request to the cloud-management platform;
   the IOT bandwidth-allocation system, in response to the determining, requesting additional cloud bandwidth from the cloud-management platform by means of an application-programming interface supported by the cloud-management platform;
   the IOT bandwidth-allocation system receiving the requested additional cloud bandwidth from the cloud-management platform; and
   the IOT bandwidth-allocation system allocating to the IOT controller a subset of the amount of additional cloud bandwidth received from the cloud-management platform.

16. The computer program product of claim 15, wherein the amount of additional bandwidth requested by the IOT controller is a function of a change in a status of at least one sensor of a cluster of sensor devices connected to the IOT controller through the IOT network.

17. The computer program product of claim 16, wherein the change of status of the at least one sensor is the at least one sensor's autonomous addition of itself to the cluster of sensors.

18. The computer program product of claim 16, wherein the IOT's bandwidth request is a function of a change in a total number of sensors comprised by the cluster of sensors at the time that the IOT generates the bandwidth request, and is a further function of an aggregate amount of bandwidth required by the cluster of sensors at the time that the IOT generates its bandwidth request.

19. The computer program product of claim 16, wherein the amount of cloud bandwidth requested from the cloud-management platform is a function of an aggregate amount of bandwidth requested by all IOT controllers connected to the system through the IOT network.

20. The computer program product of claim 15, wherein the requesting the additional cloud bandwidth from the cloud-management platform is performed as a function of an occurrence of a predetermined triggering event related to the IOT's bandwidth request.

* * * * *